United States Patent [19]

Prucnal et al.

[11] Patent Number: 5,060,305

[45] Date of Patent: Oct. 22, 1991

[54] SELF CLOCKED, SELF ROUTED PHOTONIC SWITCH

[75] Inventors: Paul R. Prucnal; Philippe A. Perrier, both of Princeton, N.J.

[73] Assignee: The Trustees of Princeton University, Princeton, N.J.

[21] Appl. No.: 399,922

[22] Filed: Aug. 29, 1989

[51] Int. Cl.⁵ .......................................... H04B 10/20
[52] U.S. Cl. .................................... 359/140; 370/108
[58] Field of Search ...................... 455/608, 612, 617; 370/1, 4, 92, 101, 108; 340/825.61

[56] References Cited

PUBLICATIONS

Prucnal, "All Optical Ultra Fast Networks", Proceedings of the 3rd Int. Conf. on Data Systems and Their Performance, Rio de Janero, Brazil, Jun. 22-25, 1987.
T. S. Kinsel, "Light Wave of the Future: Optical PCM", Electronics, Sep. 16, 1968, pp. 123-128.
Tracy S. Kinsel, "Wide-Band Optical Communications Systems: Part I—Time Division Multiplexing", Proceedings of the IEEE, Oct. 1970, vol. 58, No. 10, pp. 1666-1683.
Kondo et al., "High Speed Optical Time Switch with Integrated Optical 1×4 Switches and Single-Polarization Fiber Delay Lines", Technical Digest, Jun. 1983, pp. 438-439.
P. A. Perrier, "Optical Processing for Self-Clocking and Self-Routing in Photomic Switching Networks", Ph.D. Dissertation, Columbia Univ., 1989, pp. 4-13.
Goto et al., "Optical Time-Division Digital Switching: an Experiment", Digest of Technical Papers, 2/28-3/2, 1983, pp. 22-23.
Prucnal, Paul R. and Santoro, Mario A., "Spread Spectrum Fiber-Optic Local Area Network Using Optical Processing", Journal of Lightwave Technology, May 1986, vol. LT-4, No. 5, pp. 547-554.
Suzuki et al., "An Experiment on High-Speed Optical Time-Division Switching", Journal of Lightwave Technology, vol. LT-4, No. 7, Jul. 1986, pp. 894-899.
R. A. Thompson and P. P. Giordano, "An Experimental Photonic Time-Slot Interchanger Using Optical Fibers as Reentrant Delay-Line Memories", Journal of Lightwave Technology, vol. LT-5, No. 1, Jan., 1987, pp. 154-162.
Paul Prucnal et al., "Photonic Switch with Optically Self-Routed Bit Switching", IEEE Communications Magazine, vol. 25, No. 5, May 1987, pp. 50-55.
Rod C. Alferness, "Waveguide Elecrtrooptic Switch Arrays", IEEE Journal on Selected Areas in Communications, vol. 6, No. 7, Aug. 1988, pp. 1117-1130.
H. S. Hinton, "Photonic Time-Division Switching Systems", IEEE Circuits and Devices Magazine, Jul. 1989, pp. 39-43.
Anthony L. Lentine et al., "Multistate Self-Electrooptic Effect Devices", IEEE Journal of Quantum Electronics, vol. 25, No. 8, Aug. 1989, pp. 1921-1927.

(List continued on next page.)

*Primary Examiner*—Curtis Kuntz
*Assistant Examiner*—L. Pascal
*Attorney, Agent, or Firm*—Perman & Green

[57] ABSTRACT

An optical communication system is described wherein a message pathway is indicated by a destination address, manifested by an address time interval between a reference optical signal and an address optical signal. The optical communication system includes an optical switch for directing messages onto selected pathways. The switch includes a gate summer, and a reference circuit for applying a destination address portion of a message to the gate summer. A first delay circuit also applies the address portion of the message to the gating summer, while retarding it by a first address time interval. The gate summer sums the address portion from the reference circuit and the retarded address portion to produce a gating signal when the reference optical signal and address optical signal are time coincident. Switch means are further provided which are responsive to the gating signal to direct the message along a first selected pathway.

7 Claims, 2 Drawing Sheets

OTHER PUBLICATIONS

Anthony L. Lentine et al., "Symmetric Self-Electrooptic Effect Device: Optical Set-Reset Latch, Differential Logic Gate, and Differential Modulator/Detector", IEEE Journal of Quantum Electronic, vol. 25, No. 8, Aug. 1989, pp. 1928-1936.

Phillippe A. Perrier and Paul R. Prucnal, "Self-Clocked Optical Control of a Self-Routed Photonic Switch", Journal of Lightwave Tech., vol. 7, No. 6, Jun. 1989, pp. 983-989.

H. S. Hinton, "Applications of the Photonic Switching Technology for Telecommunications Switching", IEEE Int. Conf. on Communications, Jun. 1987, Proceedings vol. 3, pp. 1559-1564.

SELF CLOCKED, SELF ROUTED PHOTONIC SWITCH

FIELD OF THE INVENTION

This invention relates to photonic switching, and more particularly to an optically controlled, self routing photonic switch.

BACKGROUND OF THE INVENTION

Photonic switches capable of routing wide-band optical signals are a vital element of high capacity fiber-optic networks. A photonic switch generally comprises a multi-stage connecting network, each stage including switching devices and controllers, which routes optical information between input and output ports. Data flow bottlenecks occur in such switching networks when, for switching purposes, it is necessary to convert signals in optical form to electronic signals and then to reconvert them back to the form for retransmission. It is desirable to maintain the optical signals in optical form throughout the switch and to control the pathway through the switch either electronically or optically.

Electronically controlled, photonic switches have been demonstrated which include 2×2 integrated-optic, waveguide devices. Arrays of these 2×2 devices have been organized in N×N crossbar and other configurations. For instance, see "Waveguide Electrooptic Switch Arrays", Alferness, IEEE Journal On Selected Areas of Communications, Volume 6, Number 7, August 1988, pages 1117-1130. Optically controlled photonic switches have also been developed recently.

Whatever a photonic switching device is used, the speed of the switch is limited not only by the device's switching speed but by the speed of its control processor, which can, under certain circumstances, create severe data flow bottlenecks. These bottlenecks can be eliminated if optical processing is used to control the switch. If an optical processor is used with electro-optic switches requiring electric control, the processor's output must be converted to electrical signals to control the switch. The speed of such a switch is then limited by the speed of the optical decision-making process or the speed of the photonic switching device itself.

Optical control of a photonic switching element has been previously disclosed by the Inventors in "Photonic Switch With Optically Self-Routed Bit Switching" Prucnal et al., IEEE Communications Magazine, May 1987, Vol. 25 No. 25, pages 50-55. In that system, the data source encodes destination information in each data bit by using an optical spread-sprectrum technique. Each bit is encoded with a code sequence of N signals representing the destination address of that bit. An optical filter correlates its own stored address with the received encoded signal and provides an autocorrelation function output if the signal is to be switched. A crosscorrelation function indicates that the signal is not to be switched. One limitation of this technique arises from the need for orthogonal code sequences that can be distinguished at the correlator. Thus, to utilize the spread-spectrum technique, substantial bandwidth is required. In other words, for every N addresses, $N^2$ time slots are required to generate N distinguishable code sequences.

Accordingly, it is an object of this invention to provide a photonic switch wherein the switching function is controlled by a bandwidth-conserving addressing technique.

It is a further object of this invention to provide a photonic switch which is capable of being implemented with either electronic or optical control circuitry.

It is still another object of this invention to provide a self-clocked, optically controlled, photonic switch which does not require the conversion of the message being switched from optical to electronic manifestations.

SUMMARY OF THE INVENTION

An optical communication system is described wherein a message pathway is indicated by a destination address manifested by an address time interval between a reference optical signal and an address optical signal. The optical communication system includes an optical switch for directing messages onto selected pathways. The switch includes a gate summer, and a reference circuit for applying a destination address portion of a message to the gate summer. A first delay circuit also applies the address portion of the message to the gating summer, while retarding it by a first address time interval. The gate summer sums the address portion from the reference circuit and the retarded address portion to produce a gating signal when the reference optical signal and address optical signal are time coincident. Switch means are further provided which are responsive to the gating signal to direct the message along a first selected pathway.

DETAILED DESCRIPTION OF THE INVENTION

Figure 1:
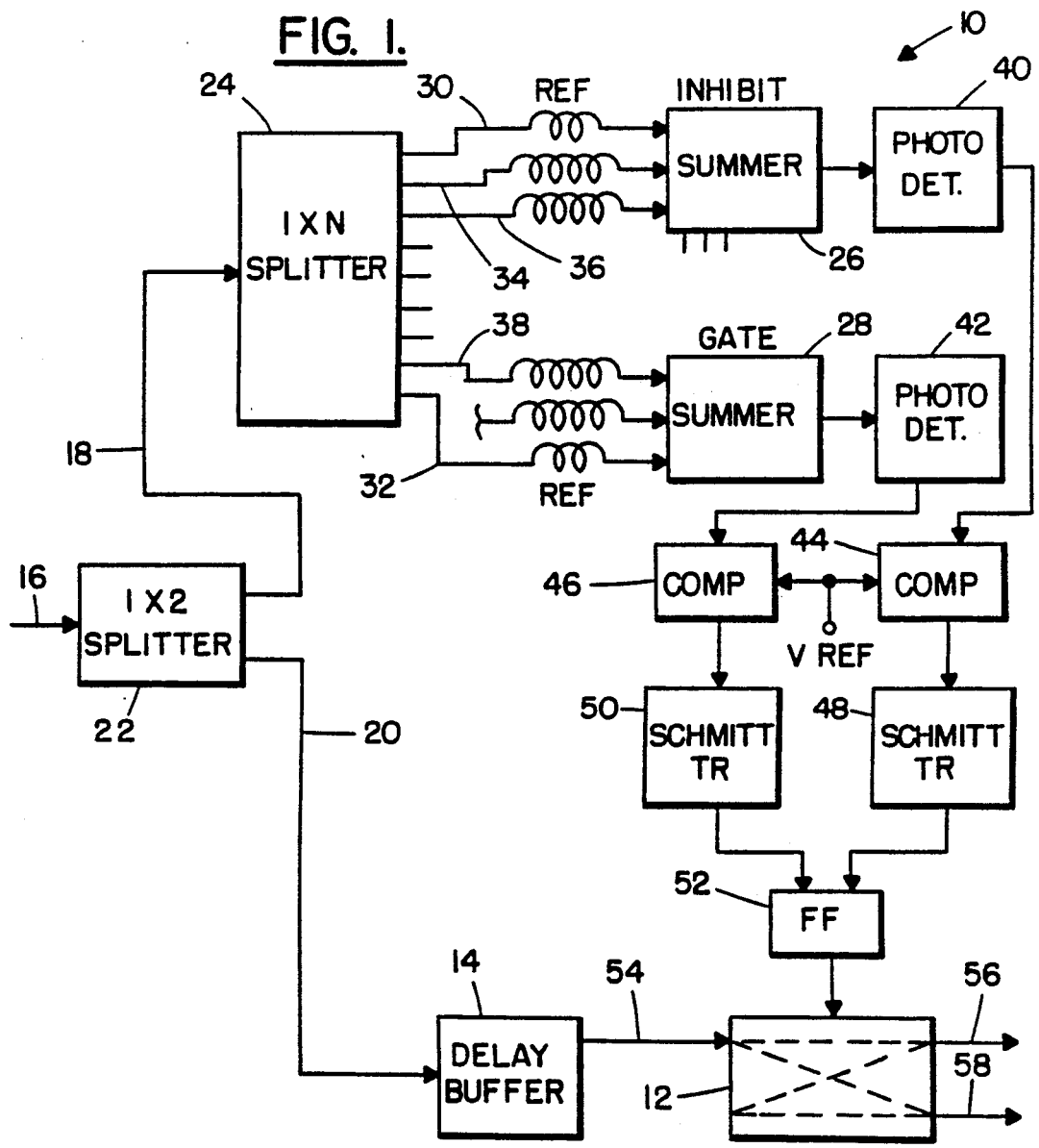
FIG. 1 is a block diagram of a photonic switch which embodies the invention.

In FIG. 1, a block diagram of a self-routing photonic switch is shown. The photonic switch comprises an optical routing controller generally indicated by 10 and a photonic switching element 12. Switching element 12 has two possible states, a cross state (switched) or a bar state (unswitched). One preferred implementation of photonic switching element 12 is a titanium-diffused, lithium niobate waveguide device such as is disclosed in the above cited Alferness paper. Such waveguide switches are provided with a control input, and an applied voltage either causes the switch to be in the bar or cross state, depending upon its level. Such devices are available from Crystal Technologies Inc., Palo Alto, Calif. and are designated OGN 2×2.

Optical routing controller 10 decodes a message's destination address and sets the state of photonic switching element 12 accordingly. A delay buffer 14 delays the input message by the processing delay through optical routing controller 10, so that the message arrives at photonic switching element 12 after element 12 has been set in accordance with the incoming address data.

Figure 2:
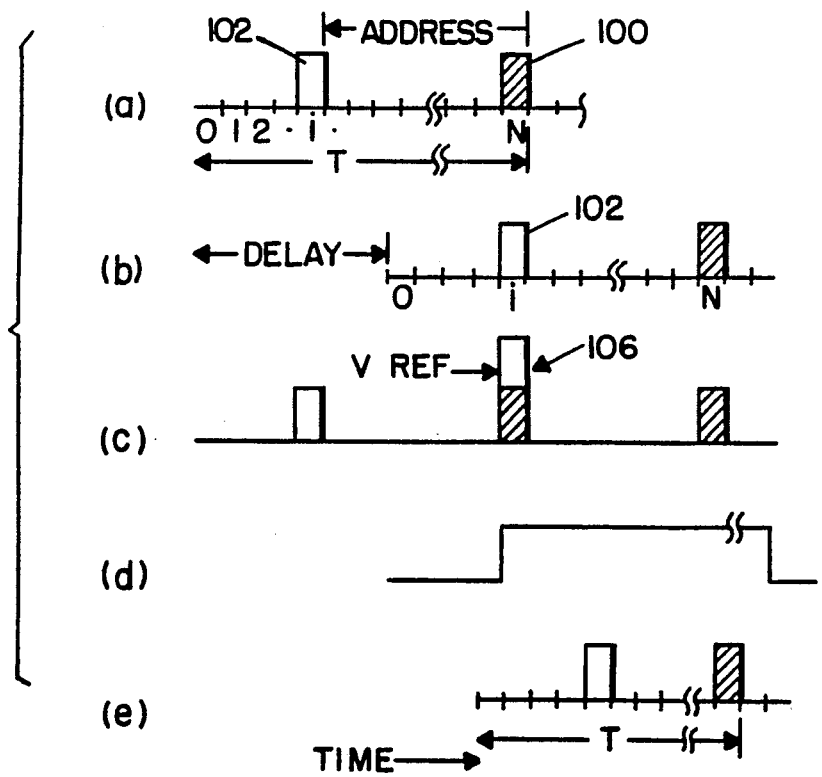
FIG. 2 are waveform diagrams helpful in understanding the operation of the invention.

Prior to describing further the details of optical routing controller 10, reference is made to FIG. 2. At a transmitter (not shown), each message is encoded with a destination address. The encoding technique is illustrated on line (a) of FIG. 2. Each message includes an address frame of time duration T. An address frame is segmented into a plurality of pulse time-slots, each slot corresponding in time to a desired address. Each address frame has, at its termination, a reference or clock pulse 100. Thus, the elapsed time between a clock pulse 100 and an address pulse 102, appearing in a pulse time slot, is indicative of the address to which a message following the address frame is to be directed. The number of addresses available in an address frame is limited only by the number of included pulse time-slots.

Referring back to FIG. 1, a message containing an address frame is received on an input fiber 16 and is emplaced on fibers 18 and 20 by signal splitter 22. As aforestated, the message signals appearing on fiber 20 are delayed in buffer 14 by a delay matching the processing delay through optical routing controller 10. The optical signal on fiber 18 is fed to a 1×N splitter 24, where N equals the number of potential destination addresses. The address frame portion of the message is routed to inhibit summer 26 and gate summer 28 through a plurality of fiber optic delay lines. A pair of reference delays 30 and 32, apply one copy of the address frame to summers 26 and 28. In addition, the address frame is applied to inhibit summer 26 through fiber delays 34 and 36 and to gate summer 28 via fiber delay 38. As will be hereinafter understood, each of delays 34, 36, and 38 is equal to a destination address. In this case, the time delay of fiber 38 is precisely equal to the address time between the address pulse and reference pulse in the received message address frame. The time delays for fiber delays 34 and 36 are equal to address times for other address frames which are not to be "gated".

As is known, summers 26 and 28 may be comprised of an optical summing structure, such as a plurality of fibers which are twisted and then melted at the twist, to cause all incoming optical signals to be mixed and summed on the respective outputs from the summer.

The outputs from summers 26 and 28 are fed to photodetectors 40 and 42 respectively, which convert the optical signals to electrical signals indicative of their luminance levels. The outputs from photodetectors 40 and 42 are fed to a pair of comparators 44 and 46 respectively. A reference voltage is applied to each of the aforesaid comparators, so that any signal output from a photodetector which exceeds the reference voltage level causes the respective comparator to produce a signal output. The outputs of comparators 40 and 46 are fed to Schmitt triggers 48 and 50 which, in turn, control the state of a set/reset latch 52 (flipflop). The output from latch 52 is employed to control the switching state of photonic switching element 12. Switching element 12, in the presence of a down state on its input, causes an optical signal on fiber 54 to feed directly through to output fiber 56. If the level from latch 52 is in the high state, the optical signal on fiber 54 is switched to output fiber 58.

Referring not to FIGS. 1 and 2 in conjunction, the operation of the photonic switch of FIG. 1 will be described. Assuming that an incoming message has an address frame such as is shown in FIG. 2, line (a), that address frame will be applied to gate summer 28 through fiber delays 32 and 38. Assuming the period of delay 38 is equal to the time between pulses 100 and 102, it can be seen that clock pulse 100 (line a) and delayed address pulse 102 (line b) will arrive in coincidence at gate summer 28. This results in the output from gate summer 28 appearing as shown at FIG. 2, line (c) wherein output pulse 106 comprises the sum of clock pulse 100 and address pulse 102.

Photodetector 42 converts each of the optical signals from gate summer 28 into proportional electronic signals and passes them to comparator 46. Comparator 46 provides an output to Schmitt trigger 50 when it senses a coincidence of pulses (e.g. pulse 106), to thereby cause Schmitt trigger 50 to provide a set input to latch 52. When latch 52 is set, it applies an "up" input to photonic switching element 12, and an optical message on fiber 54 is switched to output fiber 58.

The output of Schmitt trigger 50 (in response to pulse 106) is indicated at FIG. 2, line (d) and the optical signal gated onto fiber 58 is shown at FIG. 2, line (e).

As to the "inhibit" side of optical routing controller 10, the operation is much the same as for the gating side, except that fiber delays 34 and 36 are equivalent to address times which are to be gated onto output fiber 56. Additionally, inhibit summer 26 provides for the condition where the time between an address pulse and a clock pulse corresponding to an address not to be gated, matches the interval between two fiber delay inputs to gating summer 28. In such case, this could result in the generation of a false gating pulse by gating summer 28, but is prevented from doing so by inhibit summer 26 providing an overriding output that prevents the false gating signal from effecting switch 12. Along this line, it is to be understood that while only one address delay line 38 has been described with respect to gate summer 28, a plurality of fiber delay inputs would be ordinarily applied to accommodate all message addresses which are to be directed onto output fiber 58. The complementary address delay inputs are, of course, applied to inhibit summer 26.

As with gate summer 28, the input delays to inhibit summer 26 shift the address pulses from their time slots to the clock pulse slot, thereby resulting in a pulse of double amplitude from inhibit summer 26. (It is to be remembered that at any one time, only one address frame per message is received, so that only one address pulse and clock pulse will pass through the various delay fibers.)

A double-amplitude pulse detected by comparator 44 sets Schmitt trigger 48 which, in turn resets latch 52 to the down state. Optical routing controller 10 therefore becomes "paralyzed" immediately after one of the summers emits a double-amplitude pulse. For instance, if gate summer 28 emits a double amplitude pulse, Schmitt trigger 50 is set for predetermined period of time, during which time, latch 52 is incapable of being reset by an output from Schmitt trigger 48. The exact opposite occurs if Schmitt trigger 48 first provides a reset output to latch 52.

It is to be understood that the set and reset outputs from Schmitt triggers 48 or 50 can be adjusted to be equivalent either to a bit time, (for bit switching) or, to a full message or data packet time (to enable message switching).

Figure 3:
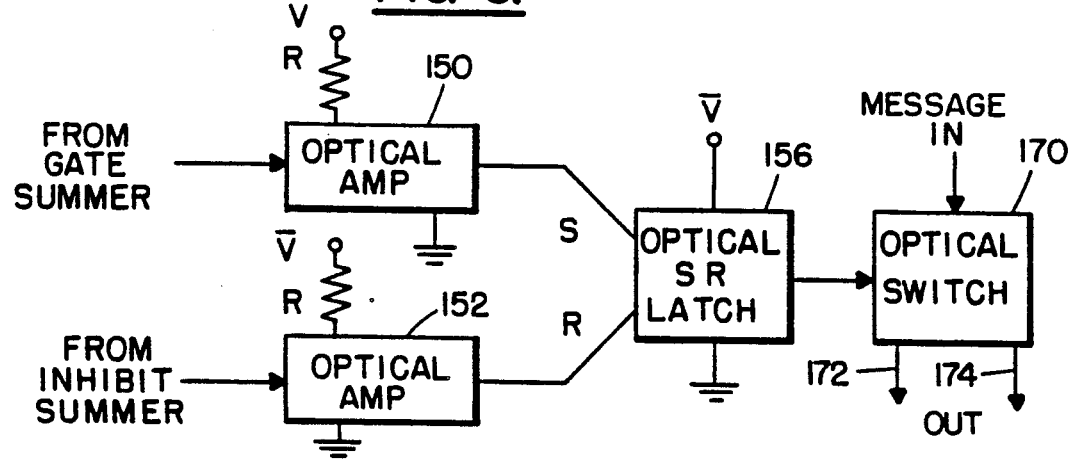
FIG. 3 illustrates an optical implementation of a portion of a circuit of FIG. 1.
Figure 4:
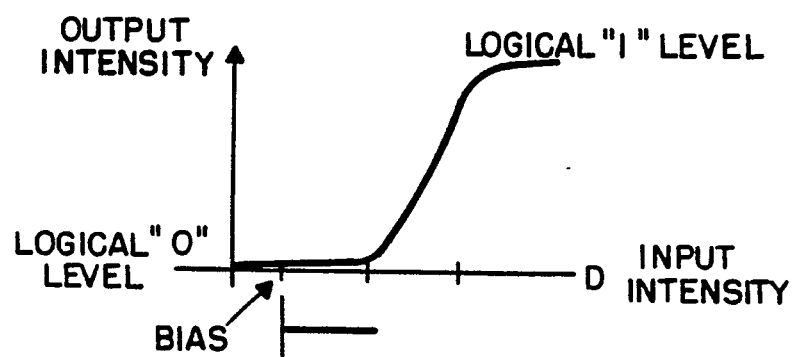
FIG. 4 is a diagram showing the relationship of the bias of the optical amplifiers in FIG. 3 to the input optical inputs.

Referring now to FIG. 3, an optical implementation is shown of the pulse level sensing portions of routing controller 10. Photodetectors 40, 42 and comparators 44, 46 have been replaced by optical amplifiers 150 and 152. Amplifiers 150 and 152 are preferably, appropriately biased laser diodes. As shown in FIG. 4, the bias level for amplifiers 150, 152 is chosen so that only when a double amplitude pulse 154 occurs, does a respective amplifier produce a set or reset pulse output, respectively.

Figure 5:
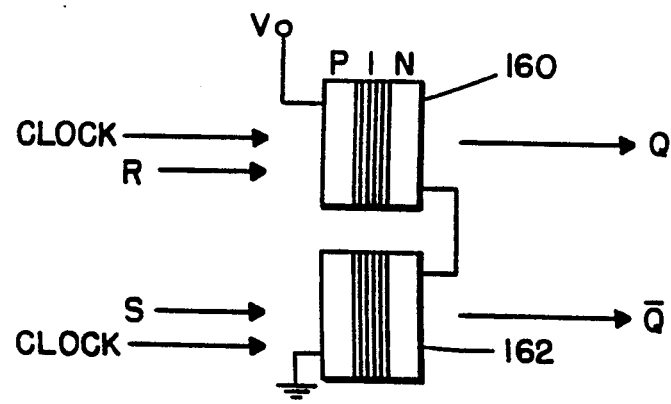
FIG. 5 illustrates a bistable optical set reset latch.

Latch 156 may be configured as a symmetric self-electrooptic effect device (S-SEED) which is a structure comprising a pair of p-i-n diodes, electrically connected in series, that acts as an optically bistable set reset latch. In FIG. 5 an S-SEED device is shown. In operation, unequal set and reset power levels cause optical diodes 160 or 162 to assume different, stable light transmission levels (one high and one low). The detailed operation of an S-SEED device, configured as a bistable latch, is described in "Symmetric Self-Electrooptic Effect Device: Optical Set-Reset Latch, Differential Logic Gate, and Differential Modulator/Detector," Lentine et al., IEEE Journal of Quantum Electronics, Vol 25, No. 8, August 1989, pp. 1928–1936.

Using Latch 156 (FIG. 3) as a differential "shutter", selectively gated light through the latch causes optical switch 170 to direct an optical message to either of output fibers 172 or 174. Switch 170 may be configured as a non-linear Fabry Perot interferometric device, which passes an incident beam if no bias beam is applied, or reflects the incident beam in the presence of a bias beam. Such devices are described in "Application of the Photonic Switching Technology for Telecommunication Switching", Hinton, Proceedings IEEE Conf. on Communications, June 1987, Vol. 3, pp. 1559–1564. Alternately, switch 170 may be configured as any other optically controllable switch, e.g. a dual core fiber device such as decribed in "Ultrafast All-Optical Glass Fiber Switching", Liao, Optics News, December 1987, pp. 27, 28.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:
1. In an optical communication system for switching messages wherein a pathway is indicated by a message's destination address which is manifested by an address time interval between a reference optical signal and an address optical signal, an optical switch for directing messages onto selected pathways comprising:
   gate summing means,
   reference means for applying to said gate summing means a portion of a message containing a destination address;
   first delay means for applying said destination address message portion to said gate summing means, said first delay means retarding said destination address message portion by a first address time interval, whereby said gate summing means sums said message portions from said reference means and said first delay means to produce a gate signal if a reference optical signal and address optical signal are time coincident; and
   switch means responsive to said gate signal to direct said message along a first selected pathway.

2. The invention as defined in claim 1 further comprising:
   second delay means for applying said destination address message portion to said gate summing means, said second delay means retarding said message portion by a second address time interval, whereby any message containing said second address time interval causes said gate summing means to produce said gate signal.

3. The invention as defined in claim 2 wherein said switch means includes means to cause said switch means to respond to a first gate signal from said gate summing means and to not respond to another signal for a predetermined time period.

4. The invention as defined in claim 3 further comprising:
   a message delay circuit connected to said switch means and having a delay equivalent to the longest signal delay through a said delay means and said gate summing means; and
   splitter means for dividing an incoming message into at least two parts, one part applied to said reference means and said first and second delay means; and another part to said message delay circuit.

5. The invention as defined in claim 1 further comprising:
   inhibit means for de-enabling, for a predetermined interval, said switch means from responding to a gate signal.

6. The invention as defined in claim 5 wherein said inhibit means includes destination address recognition means which, in response to receipt of a message bearing a destination address indicating a pathway other than said first selected pathway, generates an inhibit signal for a predetermined interval which de-enables said switch means from switching a message into said first selected pathway.

7. The invention as defined in claim 6 wherein said address recognition means comprises;
   inhibit summing means;
   reference means for applying to said inhibit summing means, a portion of a message containing a destination address,
   third delay means for applying said destination address message portion to said inhibit summing means, said third delay means retarding said destination address message portion by a third address time interval, whereby said inhibit summing means, upon receipt of a destination address message portion containing said third address time interval, sums said message portion from said reference means and said delayed message portion from said third delay means to produce an inhibit signal from a time coincident reference optical signal and address optical signal; and
   means responsive to said inhibit signal to prevent, for a predetermined period, a gating signal from operating said switch means.

* * * * *